Aug. 15, 1933. A. L. RAVEN 1,922,636
MOTION PICTURE SCREEN
Filed Oct. 26, 1931   2 Sheets-Sheet 1
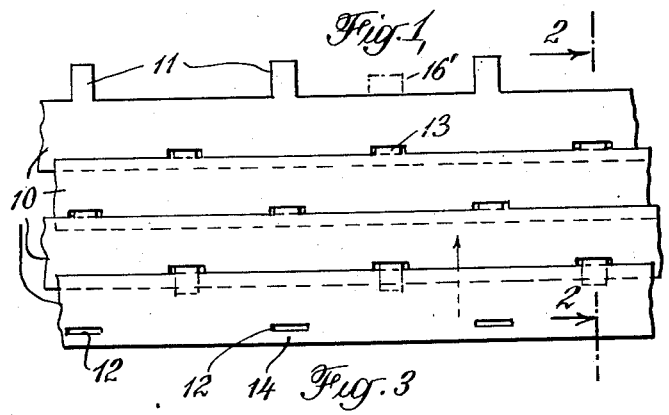
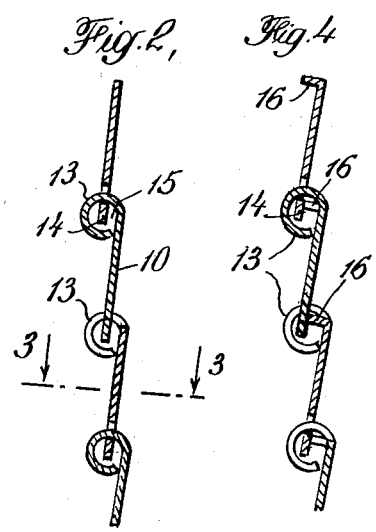
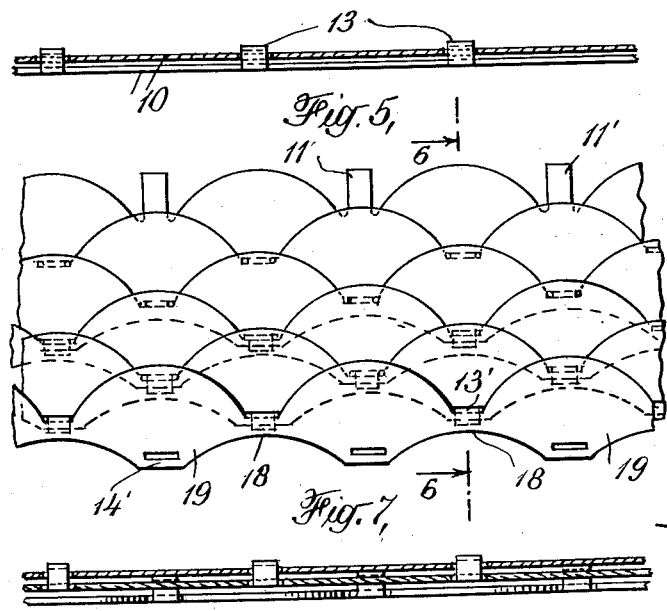
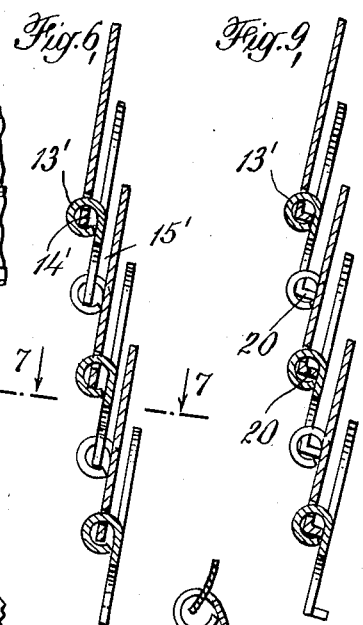
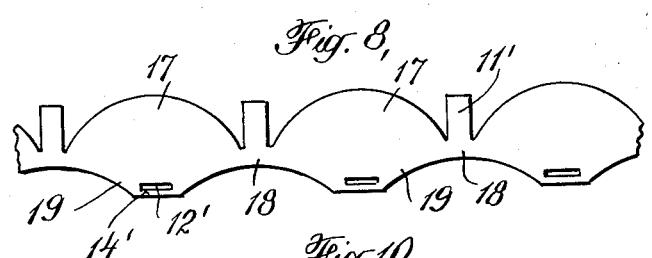
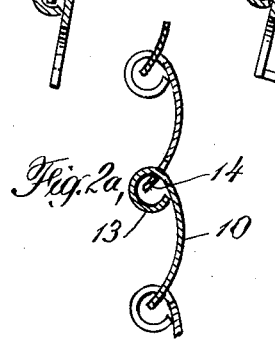
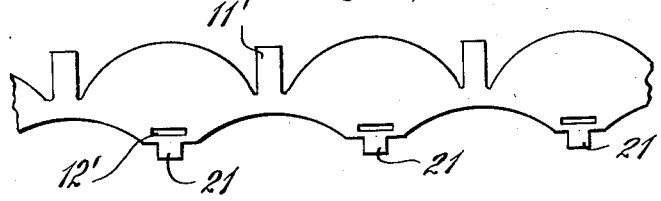
INVENTOR
Albert L. Raven
BY
Pennie, Davis, Marvin & Edwards
HIS ATTORNEYS Aug. 15, 1933.  A. L. RAVEN  1,922,636
MOTION PICTURE SCREEN
Filed Oct. 26, 1931  2 Sheets-Sheet 2
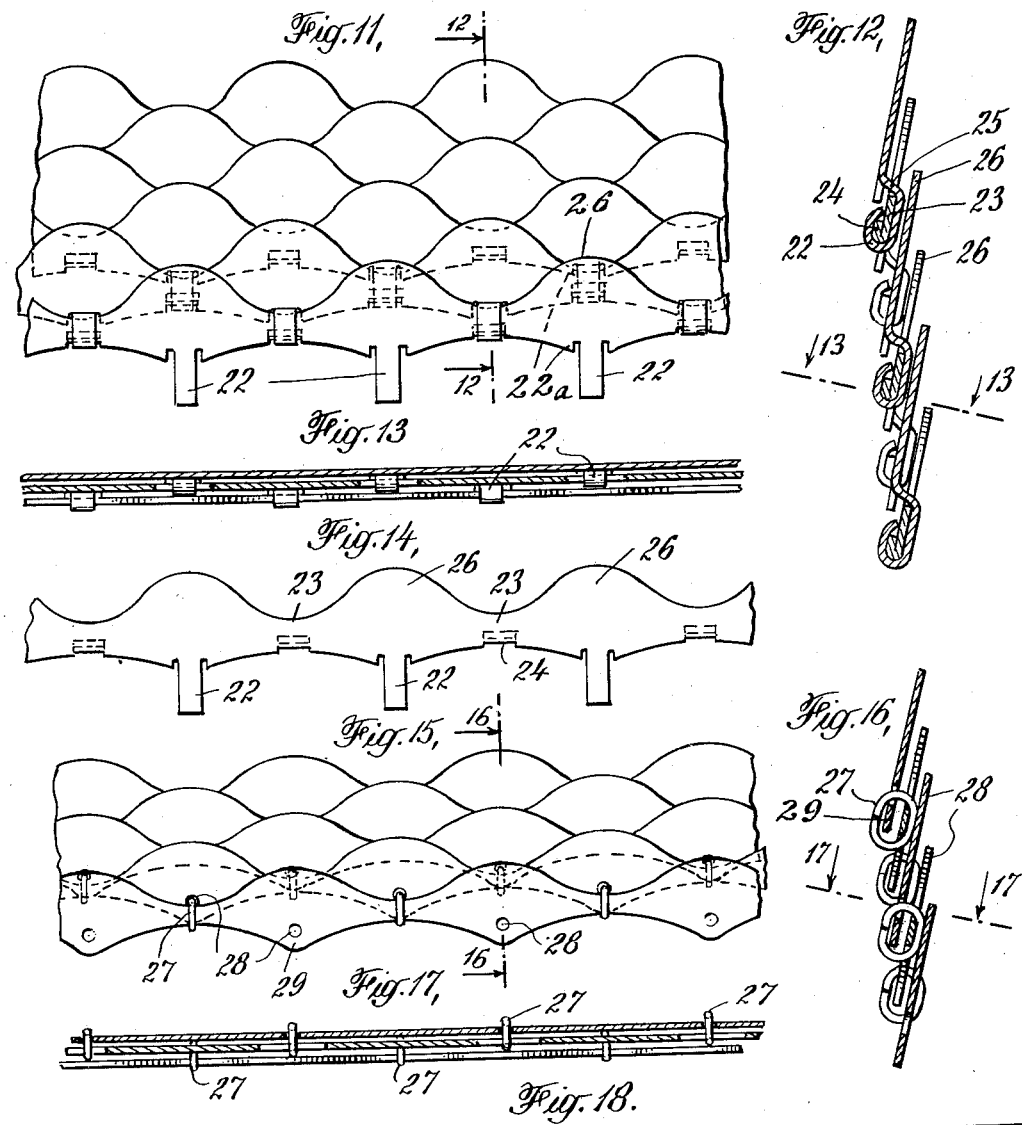
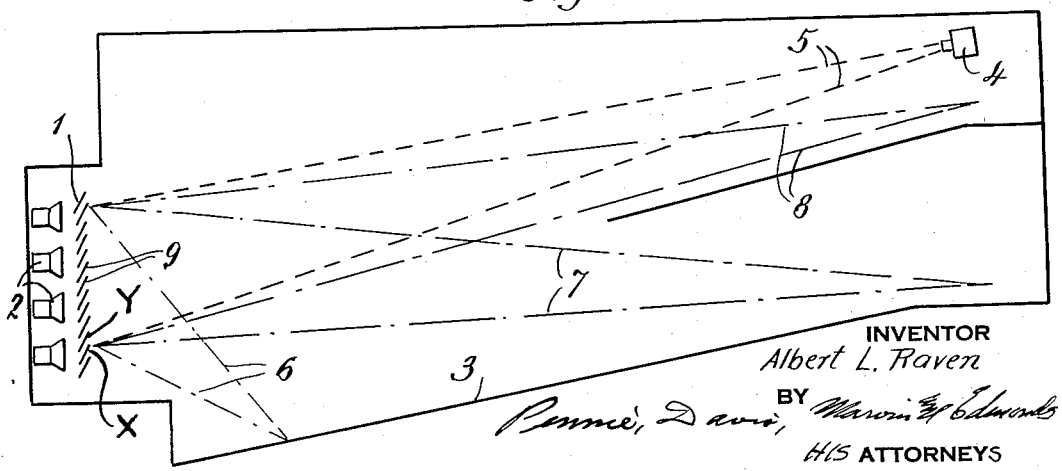
INVENTOR
Albert L. Raven
BY
HIS ATTORNEYS Patented Aug. 15, 1933

1,922,636

UNITED STATES PATENT OFFICE 1,922,636

MOTION PICTURE SCREEN

Albert L. Raven, Mount Vernon, N. Y.

Application October 26, 1931. Serial No. 571,111

12 Claims. (Cl. 88—24)

The present invention relates to picture screens intended for the showing of pictures accompanied by sound.

In order to properly show pictures accompanied by sound, and particularly talking motion pictures, it has been found necessary to have the sound transmitted through the picture screen itself rather than by placing the loud speakers around the edges of the screen. By placing the loud speakers directly behind the screen and providing a properly constructed screen, the sound, for example the voices of the actors in a talking motion picture, appears to proceed more nearly from the mouth of the person speaking. This is of particular importance with the advent of pictures which are shown on extremely large sized screens.

The proper construction of such a screen presents a number of problems. The proper reflection of the picture projected upon the screen must be provided for, and the screen should be so made that the sound will readily pass through it without being muffled, blurred or modified so as to change undesirably the character of the sound, whether speech or music. The screen must function efficiently in both of these ways so that the transmission of the sound will not affect the reflection of the picture, and vice versa.

It is important, furthermore, that the screen be easy to support in the theatre, readily hang smooth in a single plane without wrinkling, be fire proof, and be so constructed that it will collect as little dust as possible and be susceptible of being cleaned easily from time to time.

Another important consideration is that the screen be practicable to manufacture, and the manufacturing cost low.

The object of the present invention is to provide a screen which will meet these requirements, among others, and the invention will be understood from a consideration of the accompanying drawings and the following description. There are illustrated in these drawings a number of embodiments of my invention but it is to be understood that the following is an exemplifying disclosure, merely, and the construction of the screen may be modified from the examples shown without going beyond the invention which extends to the scope of the appended claims.

In these drawings,

Fig. 1 is a front elevation of a small section of one form of my improved screen made up of straight strips which also have straight upper and lower edges;

Fig. 2 is a vertical section taken on line 2—2 of Fig. 1;

Fig. 2a is a vertical section similar to Fig. 2 of a modification in which the strips are curved in cross section;

Fig. 3 is a horizontal section taken on line 3—3 of Fig. 2;

Fig. 4 is a vertical section similar to Fig. 2 showing a slight modification in the screen;

Fig. 5 is a front elevation of a small section of a screen of modified construction in which the edges are scalloped to avoid any appearance of straight lines on the surface of the screen and to conceal the connecting means between the strips;

Fig. 6 is a vertical section taken on line 6—6 of Fig. 5;

Fig. 7 is a horizontal section taken on line 7—7 of Fig. 6;

Fig. 8 is a front view of a single strip as used in the screen of Figs. 5 to 7, inclusive;

Fig. 9 is a vertical section similar to Fig. 6 and showing the additional spacing means of Fig. 4;

Fig. 10 is a similar view of the strip used in the screen of Fig. 9;

Figs. 11, 12, 13 and 14 are views corresponding to Figs. 5 to 8, inclusive, of a further modification;

Figs. 15, 16 and 17 are also views corresponding to Figs. 5 to 8, inclusive, of a still further modification;

Fig. 18 is a diagrammatic vertical section of a theatre auditorium.

Referring first to Fig. 18, the sound screen 1 is appropriately hung at the front of the auditorium with preferably a plurality of loud speakers 2 arranged behind it. The orchestra floor is indicated at 3 and the projector at 4. The broken lines 5 indicate the boundary rays from the projector. The broken lines 6 indicate the boundary rays coming from the upper and lower edges of the picture respectively to a person in the front row of the orchestra. Lines 7 indicate the boundary rays coming to a person at the rear of the orchestra, and lines 8 the boundary rays coming to a person in the balcony.

My improved screen is constructed of elements 9 arranged to overlap each other in such a way as to prevent any person in the audience from being able to see through the screen or to see shadows cast by the overlapping elements. The screen also provides a light-reflecting surface which will receive and reflect the total area of the picture projected upon it, none of the picture being lost by the presence of direct holes through the screen. The edges of the elements extend generally in a horizontal direction across the face of the screen. The extent of the overlap is made sufficient to prevent the lower boundary ray 5 from the projector from passing through the screen and also to prevent an observer in the balcony from being able to see through the screen along the lower boundary ray 8.

The strips are overlapped in such manner that the apertures between them pass upwardly from the rear toward the front of the screen, and hence shadows cast by the individual elements will be invisible to the spectators. Considering, for example, any two adjacent strips X and Y, the shadow cast by the upper edge of strip X will fall on strip Y at a point below the upper edge of strip X. Hence, it is invisible to any observer positioned below the lower boundary ray 5 from the projector.

Referring now to Figs. 1 to 3, inclusive, of the accompanying drawings, the sound screen here illustrated is composed of the straight horizontal strips 10 arranged in slightly overlapping relation and secured one to another by means of tongues 11 provided along the top of each strip which are passed through slots 12 along the bottom of each strip and bent rearwardly and downwardly to form the eyes 13 shown in Fig. 2. The slots 12 are preferably placed midway between the tongues 11 so that the connections between the strips will be staggered as shown in Fig. 1. In bending the tongues 11 to form the eyes 13, the ends of the tongues are carried beneath the bottom edges of the strips to substantially close the eyes and lock the strips together. Eyes 13 may be either circular or oblong in shape, but they are made large enough to form a flexible hinged connection. This connection is sufficiently flexible so that when the screen is hung after the manner of an ordinary sheet screen by suspending from its upper edge, each strip will swing freely from the strip next above so that the screen will hang naturally in a flat sheet. This flexibility also permits the screen to be rolled for shipping purposes.

When the screen is hanging in position gravity will cause the marginal portions 14 below the slots 12 to seek the centers of the eyes 13 which surround them, and as the eyes 13 are larger in internal diameter than the thickness of these portions 14, the overlapping portions of the strips will, of necessity, hang in spaced relation as shown in Figs. 2 and 3. The narrow openings 15 between these overlapping portions form passages for the transmission of sound waves through the screen in adequate volume to avoid all blurring.

The modification screen shown in Fig. 4 is provided with spacing lugs 16 along the upper edge of each strip. These spacing lugs are preferably formed as additional tongues 16′ intermediate the tongues 11, one of which is indicated in dotted lines in Fig. 1. These additional tongues 16′ are bent rearwardly to form spacing lugs 16. If desired, instead of placing these lugs along the upper edge of each strip they may be placed along the lower edge and then bent forwardly instead of rearwardly. The spacing lugs serve the purpose of increasing the area of the sound openings between the strips by forcing portions 14 against the rear of eyes 13. The result is that the portions 14 hang away from the centers of the eyes as shown in Fig. 4.

In the screen of Fig. 2a the strips, instead of being flat as is the case with the strips previously described, are curved somewhat in cross-section for the purpose of providing additional longitudinal stiffness. The stiffening of the strips longitudinally aids in maintaining the screen in flat condition, particularly in large-sized screens, where, for example, the strips extending throughout the entire width of the screen are from 24 to 40 feet long. This curvature has somewhat the same effect as would a longitudinal stiffening rib without increasing the amount of metal used and the weight of the screen. The curvature thus given to the front surfaces of the strips does not in any way interfere with the projection of the picture, and in fact aids in giving uniform light distribution between orchestra and balconies.

It will be understood that the width of the strips employed in the form of screen previously described, as well as in the form shown in the remaining figures of the drawings depends somewhat upon the size of the theater and the distance from the screen to the nearest row of seats, but in general, the actual width of the strips is about ¼″ or, in other words, about one-half of the width of the strips shown in the drawings, which have been drawn to an enlarged scale for the sake of clearness.

The result which it is desired to obtain with my improved screen is the effect of a screen which is, from the projection standpoint, a continuous unbroken flat surface similar to the screens used for non-sound pictures, and at the same time provide an extremely large number of sound passages through the screen which will effectively transmit the sound. The screen of my present invention accomplishes this result to a remarkable degree, even after the screen has been hanging long enough to have collected considerable dust upon the edges of the overlapping strips.

The modified forms of screen illustrated in Figs. 5 to 10, and 11 to 14, inclusive, are very much similar to the construction previously described, the principal difference being in the configuration of the strips, by means of which the connections between adjacent strips are entirely concealed without very greatly increasing the amount of overlap, and eliminating entirely any suggestion of straight lines. By means of the projections or lobes on the edges of the strips in these modifications, and the arrangement of these lobes in staggered relation vertically, the surface of the screen is given a texture which may be varied by varying the character or shape of the lobes, these lobes appearing to intersect one another in adjacent strips in such a way as to produce broken or non-continuous lines on the surface of the screen.

The screen shown in Figs. 5, 6 and 7 is made up of strips of the form shown in Fig. 8. This strip is made with spaced upwardly extending lobes or scallops 17 joined together by narrow portions 18. On the lower edge of the strip opposite the lobes 17 are projections 19. Connecting tongues 11′ are placed opposite the narrow portions 18 and connecting slots 12 at the centers of the projections 19.

The assembly of the screen is accomplished exactly as in the case of Figs. 1 and 2, projections 11′ being bent through slots 12′ and around the marginal metal 14′, to form eyes 13′. Action of gravity again causes marginal metal 14′ to seek the center of the eyes 13′, leaving sound openings 15 between adjacent elements as before. It will be seen from Fig. 5 that the lobes 17 extend upwardly sufficiently far to hide the connections between the strip immediately above and the second strip above. This tends to increase the overlap and lengthen the sound passages 15', but the narrowing of the strips at 18, thus forming the projections 19, reduces the overlap so that it is not very much greater than in the screen of Fig. 1.

In Fig. 9 is illustrated a modification of the screen of Fig. 5 by the addition of spacing lugs somewhat similar to lugs 16 of Fig. 4. The strip of this screen is made as shown in Fig. 10, it being an exact duplicate of the strip of Fig. 8 with the exception of the addition of tongues 21 on the lower edge of the screen opposite slots 12'. These tongues are bent forwardly after the stamping of the strip to form spacing lugs 20. These spacing lugs located opposite slots 12' are surrounded by the eyes 13'. They, however, serve the same purpose as lugs 16, namely that of forcing the marginal metal 14' towards the rear of the eyes 13' or, in other words, increasing the separation of the strips. Either form of lug may be used with either form of screen.

In the modified form of strips shown in Figs. 11 and 14, tongues 22 are formed along the lower edges of the strips instead of the upper, and instead of providing slots for the reception of these tongues they are passed entirely around the narrow portions 23. In order to make these narrow portions 23 still narrower they are slitted at the bottom and the metal 24 between the slits is turned back against the rear face of the strip to serve as spacing lugs. In bending the tongues 22 around these narrow portions 23, they may be bent outwardly as indicated at 25 in Fig. 12, and then downwardly and rearwardly, or they may be carried straight down back of the narrow portion 23 and then bent forwardly. The shoulders formed by turning the metal 24 prevent the strips from sliding longitudinally with respect to one another. In Fig. 12 the metal of the tongues 22 is shown as being pressed closely about the narrow portions 23. It will be understood that this forms a more or less rigid screen panel, but, preferably, the tongues 22 may be so bent as to form large eyes loosely surrounding narrow portions 23, as described in connection with the other forms of the screen. The screen will then be flexible as before. Moreover, the enlargement of these eyes will cause them to press against the rear faces of the lobes 26 and thus increase the spacing between the overlapping strips and enlarge the sound passages.

The tongues 22 have at each side a small downward projection 22a (see Fig. 11). These have the effect of reducing the width of the lobes 26 at the top necessary to cover the crevices at the joint between the next two strips above.

Referring now to Figs. 15 to 17, inclusive, in the form of screen here shown the strips are in general similar to those shown in Figs. 5 to 11, but the projecting tongues are omitted, and the adjacent strips are secured together by means of rings 27 which surround the narrow portions of the strip between the lobes and pass through circular holes 28 formed near the lower edges of the strip next above, the metal 29 between the holes 28 and the lower edge of the strip forms the central part of the hinged connection as in the case of the screens shown in Figs. 1 to 10, inclusive.

In this form of screen the rings 27 are made large enough so that the strips may be separated to form ample sound passages. The rings, however, not being fixed to either strip, the strips will tend to lie against one another when the screen is hung, but will be held apart by the contact of the rear surfaces of the lobes 26 with the outer surfaces of the rings, as indicated in Fig. 16. When the rings are flattened as illustrated the thickness of the metal of the rings determines the spacing. If the rings are not flattened the spacing is fixed by a combination of the ring thickness and curvature. Additional spacing may be obtained by placing lugs on the rear of the lobes 26 engaging the rings. If desired, also, spacing lugs similar to those shown in Figs. 4, 9 and 10 may be used for the purpose of increasing the spacing between the strips and thereby enlarging the sound passages.

Rings 27 may be either circular or oblong, but they are preferably made oblong so that the joints cannot work themselves into position to be forced apart by the thickness of the strips and thus be released. It will be observed that in this form of strip, as well as in the form of Fig. 5, the overlap is reduced to a minimum while at the same time concealing the connecting rings and holes 28.

In the screens above described, the strips are preferably made of thin spring steel. This material has the advantage of possessing great stiffness relative to its weight. It also possesses great resiliency and these two qualities are desirable as they aid in keeping the screen flat and thus provide the most desirable surface on which to project a picture. It will be understood that in hanging the screen the uppermost element will be secured at closely spaced intervals to a rigid support. The flexibility of the connections between the strips composing the screen is such that the strips will hang in freely suspended relation to each other under the influence of gravity and will therefore seek a flat vertical plane, to which, however, the surfaces of the individual strips are slightly inclined. The sound openings will thus pass through the screen upwardly from the rear toward the front, as shown diagrammatically in Fig. 18. Because the strips extend continuously from one side edge of the screen to the other, it is not necessary to apply tension to the opposite side edges to hold the screen flat, as is required with a screen which is flexible in two directions, such, for example, as a screen made of sheet material or metal mesh fabric.

Instead of spring steel, it will be understood that other suitable metal may be used also, and also that the strips may be made, if desired, from composite fabric material, molded compositions, vulcanized fiber and the like.

A further advantage of constructing the screen of metal strips is that the screen then provides an excellent foundation for the coating of light-reflecting material which is applied to the front face of the screen. This coating usually consists of lacquer containing suitable pigments. The metal forms a base for this coating which is non-absorptive and a light-reflecting surface is obtained which is reflective to a much higher degree than is the case with fabric screens.

With my improved screen, therefore, not only is the sound transmitted through the screen in adequate volume, without muffling or blurring, but also the dusty effect caused by the presence of direct sound openings which subtract from 10 per cent. to 25 per cent. from the total area of the picture is eliminated. Also, an extraordinarily bright picture is produced with a minimum of light from the projector.

It will be understood that in the accompanying drawings the strips composing the several screen structures have been illustrated to an enlarged scale in order to show their construction clearly, and that in the actual screens the strips are preferably small enough so that their outline can scarcely be distinguished a few feet from the screen. A person viewing a picture projected upon the screen is unconscious of the strip formation and the screen appears to have a uniform surface.

With the forms of screen illustrated in Figs. 5 to 18, inclusive, however, even when the strips are of comparatively large size their outline and arrangement is such that from a short distance in front the screen appears to have an agreeable texture. Moreover, a person viewing a picture projected upon it is unconscious of this texture.

This application is in part a continuation of my copending application Serial No. 302,048, filed August 25, 1928, and in part a continuation of my copending application Serial No. 467,149, filed July 11, 1930, now Patent No. 1,828,749 granted October 27, 1931.

I claim:

1. A screen for the projection of pictures accompanied by sound comprising a plurality of straight horizontal strips arranged in overlapping spaced relation to form a panel to receive the projected picture having sound passages therethrough extending upwardly from the rear towards the front of the screen, and said strips having means for flexibly suspending the same one from another to permit the screen to hang flat.

2. A screen for the projection of pictures accompanied by sound comprising a plurality of horizontal strips hinged together in overlapping relation to form a screen panel to receive the projected picture, the hinges thereof being offset so as to cause the strips to hang in spaced relation to provide sound passages through the screen.

3. A screen for the projection of pictures accompanied by sound comprising a plurality of horizontal strips arranged in overlapping relation to form a screen panel to receive the projected picture, hinging means for securing said strips one to another, said means including a pin member on a strip, and an eye member larger in internal diameter than said pin on and extending to one side of the adjacent strip so as to cause the strips to hang in spaced relation to provide sound passages through the screen.

4. A screen for the projection of pictures accompanied by sound comprising a plurality of horizontal strips arranged in overlapping relation to form a screen panel to receive the projected picture, hinging means for securing said strips one to another, said means including a hinge pin member and an eye member larger in internal diameter than said pin, and spacing means carried by each strip to hold the overlapping strips in spaced relation and cause said hinge members to hang eccentrically with respect to each other.

5. A screen for the projection of pictures accompanied by sound comprising a plurality of horizontal strips arranged in overlapping relation to form a screen panel to receive the projected picture, hinging means for securing said strips one to another, said means including a pin member on a strip and an eye member larger in internal diameter than said pin on and extending to one side of the adjacent strip so as to cause the strips to hang in spaced relation and spacing members carried by each strip to force said hinged members to hang eccentrically and thus increase the spacing between said overlapping strips.

6. A screen for the projection of pictures accompanied by sound comprising a plurality of straight horizontal strips arranged in overlapping relation to form a screen panel to receive the projected picture, said strips having alternating wide and narrow portions, means for connecting said strips together comprising a member secured near the edge of one strip and loosely encircling a narrow portion of an adjacent strip.

7. A screen for the projection of pictures accompanied by sound comprising a plurality of straight horizontal strips arranged in overlapping relation to form a screen panel to receive the projected picture, said strips having alternating wide and narrow portions, means for connecting said strips together, comprising a member secured near the edge of one strip and loosely encircling a narrow portion of an adjacent strip, said narrow portions having a pair of spaced cuts extending inwardly from one edge, the material between said cuts being turned back against one side of the strip to form a spacing lug for maintaining said strips in spaced relation to provide for the passage of sound.

8. A screen for the projection of pictures accompanied by sound comprising a plurality of straight strips having projections arranged along both edges in spaced relation and in vertical alignment and having narrow portions intervening, said strips being arranged in overlapping relation with said projections staggered with respect to one another, rings loosely encircling the said narrow portions of said strips and passing through holes near the tips of the projections along one edge of the adjacent strips, the outer surfaces of said rings engaging the rear surfaces of the upward projections of a lower strip and holding said strips apart to provide sound passages through the screen.

9. A screen for the projection of pictures accompanied by sound comprising a plurality of straight horizontal strips of stiff resilient material extending in length throughout the width of the screen, said strips being arranged in overlapping relation and loosely hinged together so that they will hang in a single plane to provide a substantially flat surface to receive the projected picture.

10. A screen for the projection of pictures accompanied by sound comprising a plurality of strips of resilient material of uniform thickness having an outwardly curved cross-section to impart stiffness, said strips being arranged in overlapping relation to form a screen panel and extending in length throughout the width thereof, said strips being loosely hinged together so as to allow the strips to hang in a single plane and form a substantially flat surface to receive the projected picture.

11. A screen for the projection of pictures accompanied by sound comprising a plurality of straight horizontal strips arranged in overlapping spaced relation to form a panel to receive the projected picture having sound passages therethrough extending upwardly from the rear towards the front of the screen, and said strips having hinges thereon for flexibly suspending the same one from another to permit the screen to hang flat.

12. A screen for the projection of pictures accompanied by sound comprising a plurality of horizontal strips arranged in overlapping relation to form a screen panel to receive the projected picture, said strips having spaced projections along their upper edges arranged in staggered relation vertically so as to give the screen a desirable texture, hinging means for securing said strips one to another, said means including a hinge pin member and an eye member larger in internal diameter than said pin, said hinging means between adjacent strips being concealed by said projections on a lower strip, and spacing means on each strip to hold the overlapping strips in spaced relation and cause said hinge members to hang eccentrically with respect to each other thereby providing sound passages through the screen.

ALBERT L. RAVEN.